United States Patent [19]

Bourbeau

[11] Patent Number: 5,749,270
[45] Date of Patent: May 12, 1998

[54] COAXIAL CABLE CORING TOOL

[75] Inventor: Roger R. Bourbeau, Glastonbury, Conn.

[73] Assignee: Ben Hughes Communication Products Company, Chester, Conn.

[21] Appl. No.: 789,837

[22] Filed: Jan. 29, 1997

[51] Int. Cl.[6] .................................... H02G 1/12
[52] U.S. Cl. ................... 81/9.4; 30/90.4; 29/566.4; 408/230
[58] Field of Search .................. 30/90.4; 81/9.4; 29/566.4; 408/204, 206, 230

[56] References Cited

U.S. PATENT DOCUMENTS

| | | | |
|---|---|---|---|
| 4,459,881 | 7/1984 | Hughes | 81/9.4 |
| 4,729,268 | 3/1988 | Morrow | 81/198.8 |
| 5,023,995 | 6/1991 | Kaplan | 81/9.4 X |
| 5,511,305 | 4/1996 | Garner | 30/90.4 X |

*Primary Examiner*—Douglas D. Watts
*Attorney, Agent, or Firm*—McCormick, Paulding & Huber

[57] ABSTRACT

A tool for preparing a coaxial cable for termination includes a tool holder supporting an axially elongated cylindrical cutter and carrying a guide bushing for maintaining an end portion of a coaxial cable in coaxial alignment with the cutter as the cutter is rotated relative to the cable. A chamfer on the free end of the cutter defines the radially outer extent of a first cutting edge which removes core material contained within the metallic outer sheath of the cable. A coaxial bore extends through the cutter and receives the cable central conductor. A second cutting edge located near the free end of the cutter and partially defined by the cutter bore wall skives core material in close proximity to the surface of the central conductor. A third cutting edge spaced from the first and second edges strips material from the metallic sheath to expose an end portion of the conductor beyond the end of the sheath.

20 Claims, 3 Drawing Sheets

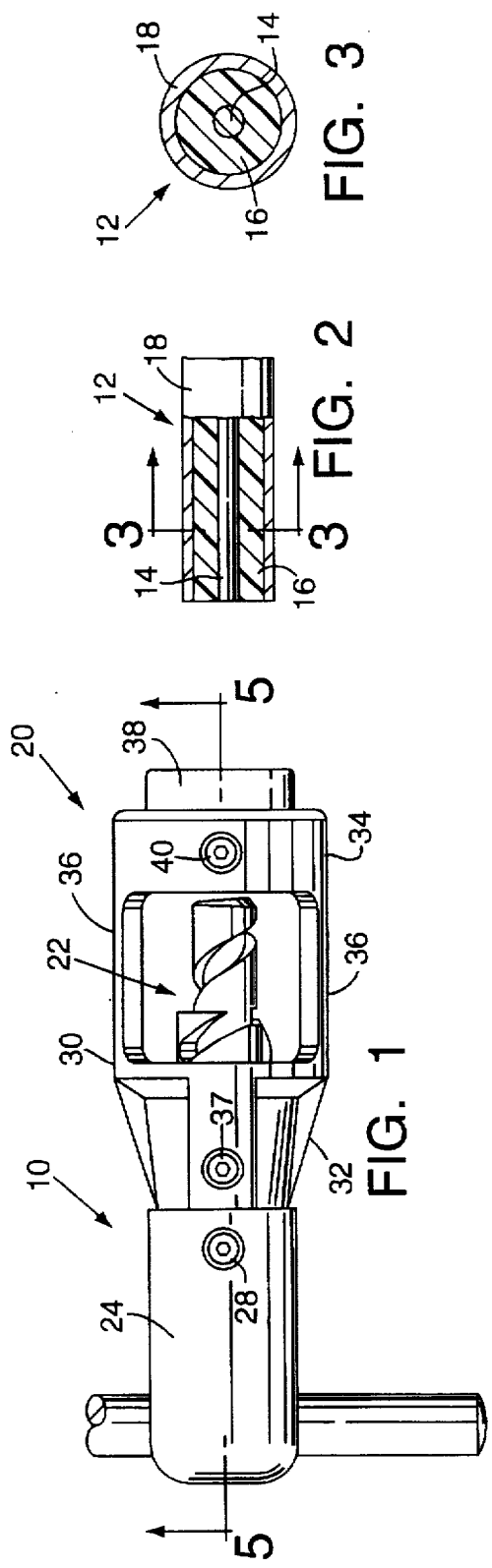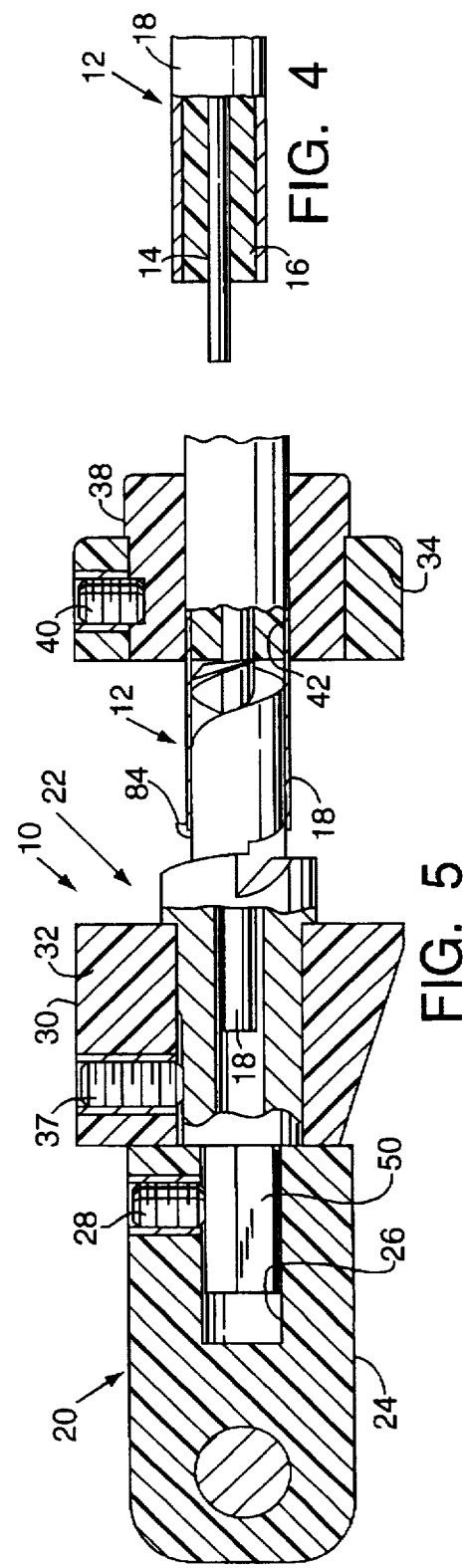

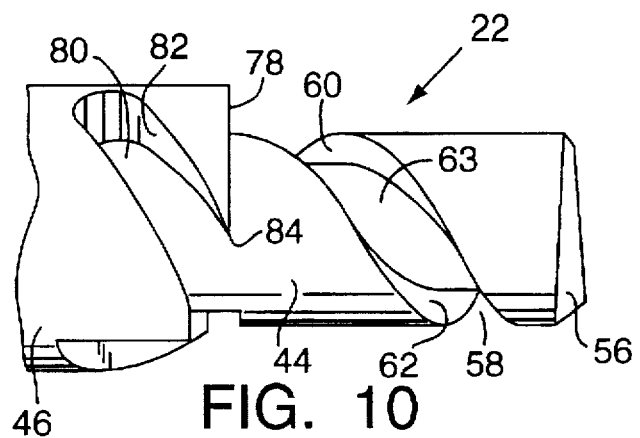
FIG. 10
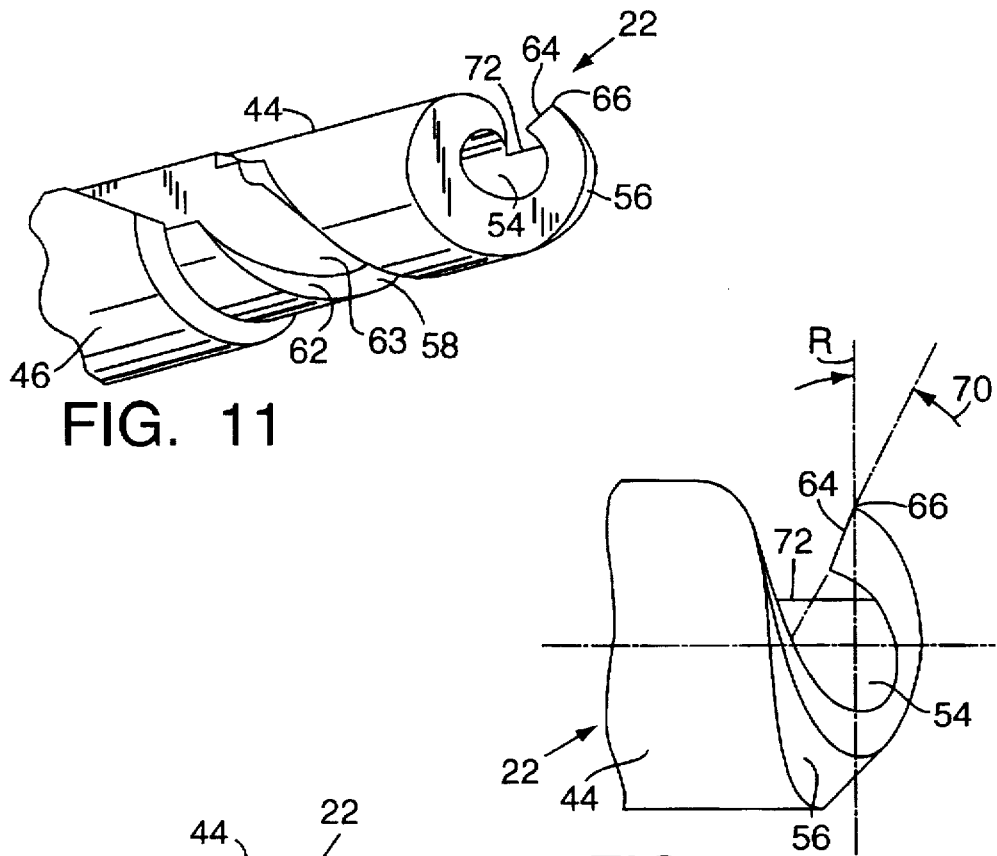
FIG. 11
FIG. 12
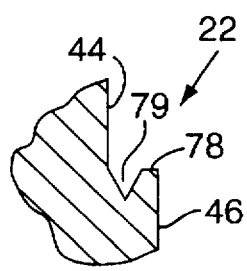
FIG. 13

5,749,270

COAXIAL CABLE CORING TOOL

BACKGROUND OF THE INVENTION

This invention relates in general to tools for working on electrical cable and deals more particularly with improvements in a tool for preparing a coaxial cable for electrical termination. Tools of the type of which the present invention is concerned are illustrated and described in U.S. Pat. Nos. 4,459,881 to Hughes, Jr. for Cable Coring and Stripping Tool and Method, issued Jul. 17, 1984 and 4,729,268 to Morrow for Coaxial Cable Skiving Tool, issued Mar. 8, 1988. The aforesaid two patents are assigned to the assignee of the present invention.

A typical coaxial cable of the type with which the tool of the present invention is used has a cylindrical tubular metallic sheath containing dielectric core material and coaxially surrounding an axially elongated central conductor. A tool for preparing such a cable for termination must be capable of entering an end portion of the cable sheath and removing the dielectric material from the cable end portion to substantially expose associated portions of the interior surface of the cable sheath and the exterior surface of the central conductor without damaging the latter surfaces.

Tools heretofore available for performing the afore-described cable preparation operation, exemplified by those tools illustrated and described in the aforementioned U.S. patents, usually include a tool holder which carries a cutter and has means for maintaining the cutter and the cable in substantial coaxial alignment with each other as the cutter is rotated relative to the cable during the core removal operation. However, any slight misalignment of the cutter relative to the coaxial cable, particularly during initial entry of the cutter into the cable sheath, can cause scratching or gouging of the inner surface of the tubular sheath and/or the cylindrical outer surface of the central conductor resulting in poor cable termination and possible interruption of signals carried by the cable. More specifically, a poor surface finish on the cable end portion reduces the area of surface contact between the cable end portion and a terminal attached to it by a subsequent cable termination operation. Further, any depressions or gouges in the metallic surfaces of the cable may provide opportunity for the development of oxidation or corrosion which may ultimately lead to failure of the termination. The present invention is concerned with the aforesaid problems.

In accordance with the present invention, an improved coaxial cable coring tool is provided which includes a cutter adapted to enter the metallic sheath of an associated coaxial cable in a manner which assures accurate initial coaxial alignment between the cable and the tool as the tool is rotated within the cable sheath and relative to the cable. A further aim of the invention is to provide a cable coring tool having an improved cutter which avoids risk of cutting, gouging or scratching the interior surface of the metallic cable sheath while the cable coring operation is being performed.

SUMMARY OF THE INVENTION

A coaxial cable coring tool is provided for use with a coaxial cable having an axially extending cylindrical central conductor, a generally cylindrical dielectric core in coaxial surrounding engagement with the conductor and a generally cylindrical metallic tubular sheath in coaxial surrounding engagement with the core. The tool includes a cutter holder and an axially extending cutter mounted in and projecting axially outwardly from the holder. The cutter has a generally cylindrical coring portion extending to its outer end and a coaxial cylindrical bore defined by a bore wall and opening through the outer end of the cylindrical coring portion for receiving an end portion of the central conductor therein. The bore has a diameter at least equal to the diameter of the central conductor. The cylindrical coring portion includes a first cutting edge for removing a portion of the dielectric core from an end portion of the cable when the cutting tool is coaxially rotated in cutting engagement with the core and relative to the cable. In accordance with the invention the first cutting edge extends generally radially outwardly from the bore wall to a termination point on the outer peripheral surface of the cutter. The termination point is spaced radially outwardly from the axis of the bore a distance less than the radial dimension of the cylindrical coring portion.

A BRIEF DESCRIPTION OF THE DRAWINGS

FIG. 1 is a top plan view of a cable coring, skiving and stripping tool embodying the present invention.

FIG. 2 is a fragmentary side elevational view of a typical coaxial cable with which the tool is used.

FIG. 3 is a sectional view taken along the line 3, 3 of FIG. 2.

FIG. 4 is a fragmentary side elevational view of a coaxial cable prepared for termination by the tool of FIG. 1.

FIG. 5 is a somewhat enlarged fragmentary sectional view taken along the line 5, 5 of FIG. 1, and shows the tool in cutting relation to a coaxial cable.

FIG. 10 is a fragmentary side elevational view of the cutter shown rotated approximately 90 degrees from its position of FIG. 7.

FIG. 11 is a fragmentary perspective view of the cutter.

FIG. 12 is a somewhat further enlarged fragmentary perspective view of an end portion of the cutter.

FIG. 13 is a somewhat enlarged fragmentary sectional view taken along the line 13, 13 of FIG. 8.

DETAILED DESCRIPTION OF PREFERRED EMBODIMENT

Figure 6:
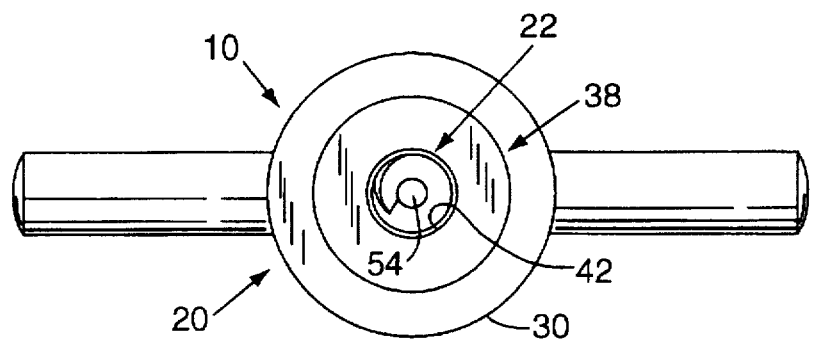
FIG. 6 is a somewhat enlarged front elevational view of the tool.

In the drawings and in the description which follows, the present invention is illustrated and described with reference to an improved cable coring, skiving and stripping tool shown in FIG. 1 and indicated generally by the reference numeral 10. The illustrated hand tool 10 is particularly adapted to prepare a coaxially cable for termination. However, before further considering the tool, a typical coaxially cable of the type with which the tool is used will be briefly described.

Referring now particularly to FIGS. 2-4, the illustrated coaxially cable, indicated generally at 12, has a generally cylindrical axially extending central conductor 14 coaxially surrounded by a generally cylindrical dielectric core 16, which may, for example, comprise a cellular plastic material, such as foamed polyethylene, which may be bonded to the cylindrical surface of the central conductor. The outer wall of the illustrated cable 12 is formed by a generally cylindrical thin walled tubular metal sheaf 18 engaged with and coaxially surrounding the dielectric core 16, which may be bonded to the interior surface of the sheaf. The illustrated tool 10 is particularly adapted to remove core material 16 from an end portion of the cable to expose an associated portion of the inner surface of the metal sheaf 18 and a portion of the outer surface of the central conductor 14. The tool may also be employed to strip or cut away in an end portion of the cable sheaf 18 so that a portion of the central conductor 14 extends axially outwardly beyond the end of the sheaf. If the core material is not bonded to either the sheaf or the central conductor, the normal coring operation performed by the tool on the cable 12 will substantially remove the core material exposing the mill finishes on both the central conductor and the inner surface of the sheaf, leaving the end portion of the cable 12 substantially as it appears in FIG. 4, all of which will be here and after further discussed. However, it should be noted that if core material is bonded to either the sheaf or the central conductor a secondary operation may be required to remove such core material as may remain adhered to the cylindrical outer surface of the central conductor and/or the inner surface of the sheaf after the coring operation has been performed.

Referring now to FIGS. 1, 5 and 6, the illustrated coring, skiving and stripping tool 10 essentially comprises a tool holder, indicated generally at 20, and an axially elongated cutting tool or cutter mounted on the tool holder, projecting axially outwardly from it, and designated generally by the numeral 22.

The tool holder may be made from any suitable material, but preferably it is formed from a durable high impact plastic material and includes a generally T-shaped handle 24 which has a forwardly open generally cylindrical blind bore 26 for receiving a rear shank portion of the tool 22, as will be herein after further discussed. A set screw 28 carried by the handle engages a flat surface on the rear shank portion of the cutter 22 to releasably secure the handle 24 in assembly with the cutter 22.

The illustrated tool holder 20 also includes a body part or guide member 30, which is preferably formed as a separate part of the tool holder 20 and which includes a rear portion 32 and a forward portion 34 integrally connected by a pair of diametrically opposed side members 36, 36, best shown in FIG. 1. The guide member 30 carries a set screw 37 which engages another shank part of the cutter to releasably secure the guide member 30 in fixed position on and relative to the cutter 22.

The guide member 30 functions to maintain an end portion of a coaxial cable, such as the cable 12, in coaxially alignment with the cutter 22 during the cable preparation operation and, for this reason, a generally cylindrical tubular alignment bushing 38 is releasably secured in the forward portion 34 by another set screw 40 threadably engaged within the forward portion and bearing upon the alignment bushing 38. The alignment bushing 38 has a cylindrical bore 42 extending coaxially through it, the diameter of the bore 42 being substantially equal to the outside diameter of the cable sheaf 18 to receive the sheaf 18 therein and allow for free rotation of the alignment brushing relative to the cable sheaf.

Referring now to FIGS. 7-11, and further considering the cutter, the illustrated cutter 22 essentially comprises an axially elongated generally cylindrically stepped hardened steel member which has a cylindrical coring portion 44 at its forward or free outer end and a diametrically enlarged stripping portion 46 immediately rearward of the coring portion. A generally cylindrical first shank 48 extends coaxially rearwardly from the stripping portion 46 and has an outside diameter substantially equal to the inside diameter of the bore in the guide member rear portion 32 in which it is received. A single flat 49 formed on the first shank 48 provides a seating surface for the set screw 28 which secures the guide member 30 in non-rotatable assembly with the cutter 22. A second or rear shank portion 50 of further reduced diameter projects coaxially rearwardly from the first shank portion 48 and is sized to be slideably received within the handle bore 26. Three equiangularly spaced apart flats 52, 52 formed on the second shank portion 50 provide three possible seating surfaces for the set screw 28 so that the handle 20 may be secured in assembly with the cutter 22 in any one of three possible angular positions relative to the cutter for a reason which will be hereinafter evident. A coaxial bore 54 formed in 20 the cutter 22 opens outwardly through the forward end of the cutter and preferably extends throughout the entire length of the cutter opening outwardly through the rear end of the second shank portion 50, substantially as shown in the drawings. The bore 54 has a diameter at least equal to the diameter of the cylindrical central conductor 14, but preferably the bore diameter is slightly larger than the diameter of the central conductor.

Figure 7:
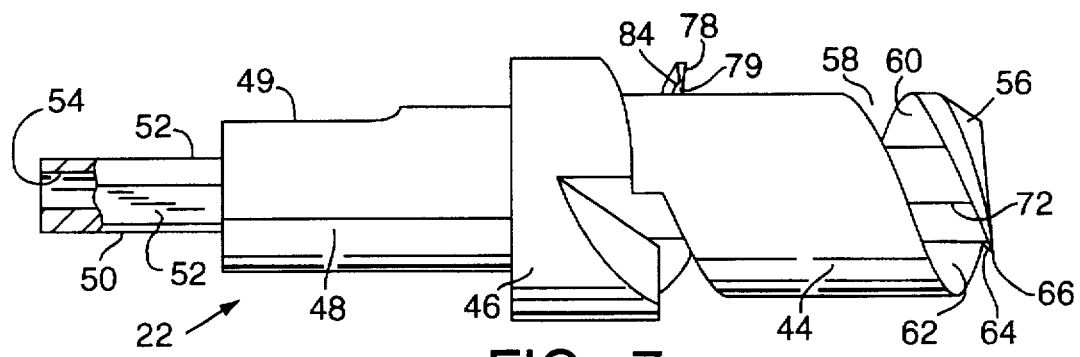
FIG. 7 is a somewhat further enlarged side elevational view of the cutter.
Figure 8:
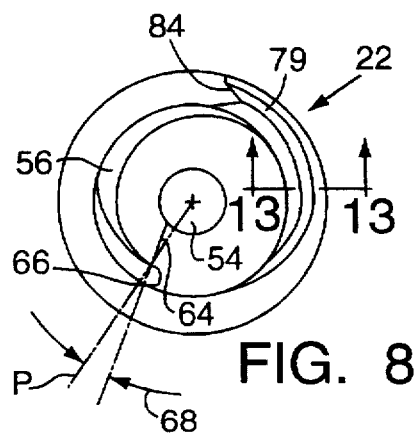
FIG. 8 is a front end view of the cutter shown in FIG. 7.
Figure 9:
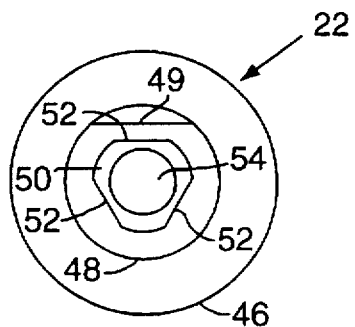
FIG. 9 is a rear end view of the cutter shown in FIG. 7.

In accordance with the present invention, the cutter 22 has a forwardly converging conical chamfer 56 is formed on the forward end of the coring portion 44 formed less than one full convolution of the coring portion. The axis of the conical chamfer 56 is preferably coincident with the axis of the stepped cylindrical cutter 22. A spiral relief channel 58 formed in the coring portion 44 and defined by opposing channel side walls 60 and 62 and a radially outwardly facing inner wall 63 opens radially outwardly through the cylindrical outer peripheral surface of the coring portion and through the forward end of the coring portion 44. A first cutting edge 64 formed at the forward end of the cutter 22 by intersection of the spiral channel walls 60 and 62 extends outwardly from the bore 54 to a termination point 66 at the chamfer 54. The termination point 66 shown in FIGS. 7 and 8, is spaced from the central axis of the tool a distance less than the radial axial dimension of the coring portion 44.

The first cutting edge 64 is preferably skewed at a compound angle relative to the axis of the cutter 22. More specifically, the first cutting edge 64 is skewed relative to an axial plane of the cutter passing throughout the termination point 66, as best shown in FIG. 8 wherein the aforesaid axial plane is identified by the letter P and the angle of cutting edge skew is indicated by the numeral 68.

Further, and in accordance with the invention, the first cutting edge 64 is also skewed relative to a radial line extending from the axis of the cutter 22 and passing through the termination point 66, as best shown in FIG. 12 wherein the aforesaid radial line is identified by the letter R and the angle of cutting edge skew relative to the line R is shown by the numeral 70. Thus, the rectilinear first cutting edge 64 is skewed at a compound angle relative to the axis of the cutter 22. The cutting edge 64 does not lie within either an axial or a radial plane of the cutter 22.

Preferably, and as shown, the coring portion 44 has a second cutting edge or skiving edge 72 located near the outer end of the spiral relief channel 58 and formed by the intersection of the relief channel inner wall 63 and the wall of the bore 54. The second cutting edge 72 is preferably a rectilinear edge disposed in generally parallel relation to the cutter axis and preferably angularly spaced about the axis of the cutter 22 from the first cutting edge 64 as best shown in FIGS. 11 and 12. The second cutting or skiving edge 72 cuts core material as the cutter 22 advances into the coaxial cable sheath 18 during performance of the cable coring operation.

As previously noted, the inside diameter of the bore 54 is preferably slightly larger than the outside diameter of the central conductor 14, so that the second cutting edge 72 does not directly engage the outer surface of the central conductor 14. The second cutting edge engages coring material 16 in close proximity to the surface of the central conductor 14, thereby avoiding risk of damage to the cylindrical surface of the conductor.

The illustrated cutter 22 further includes a third cutting or stripping edge formed on the stripping portion 46. More specifically, the stripping portion 46 has a generally radially disposed forwardly facing helical surface 78 which has a forwardly open groove 79 of V-shaped cross-section formed therein. A spiral relief channel or flute 80 formed in the stripping portion 46 and partially defined by a side wall 82, as shown in FIG. 10, intersects the helical surface 78 to define the third cutting or stripping edge 84 which has a generally V-shaped, as best shown in FIG. 8. The stripping edge 84 is axially spaced from the first and second cutting edges and adapted to engage the free edge of the outer cable sheath 18 and cut away a portion of the cable sheath 18 to expose the central conductor so that the conductor 14 extends for some distance beyond the end of the sheath, generally as shown in FIG. 4.

For a further disclosure of tools of the type hereinbefore described reference may be had to the aforementioned U.S. Pat. Nos. 4,459,881 to Hughes, Jr. and 4,729,268 to Morrow which are hereby adopted by reference as part of the present disclosure.

Considering now the operation of the tool 10, a coaxial cable to be prepared, such as the cable 12, usually has a free end cut as shown in FIG. 2, so that the end faces of the central conductor 14, the core 16 and the cable sheath 18 lie generally within a common radial plane of the conductor. The cut end portion of the cable 12 is inserted into the guide or alignment bushing 38 through the bore 42 which coaxially aligns the end of the cable with the forward or cutting end of the cutter 22. The end of the cutter 22 is then brought into face-to-face relation with the exposed end of the cable core 16, after which the tool 10 is rotated in cutting engagement with the core material 16 while light pressure is applied to the tool in the direction of the cable 12 to cause the first cutting edge 64 to engage and cut core material 16. The chamfer 56 at the leading end of the tool enables the smooth entry of the tool into the cable sheath 18 as core material is removed by the first cutting edge 64. The compound angle of the first cutting edge 64 relative to the axis of the tool established substantially point contact between the advancing cutting edge and the coring material so that the cutting operation may progress in response to relatively light rotational pressure applied to the tool holder handle 24. The lead chamfer 56 further assures accurate coaxial alignment between the cutter and the sheath as the cutter 22 initially advances into the sheath. Since the termination point 66 of the first cutting edge 64 is spaced slightly inwardly from the inner surface the cable sheath the risk of scoring or gouging the interior surface of the sheath 18 is substantially eliminated. During the coring operation the second cutting edge 72 also engages and cuts or skives the core material to separate core material from the central conductor 14 to which it is or may be bonded.

When the third cutting or stripping edge 84 engages the sheath 18 further rotation of the tool 10 relative to the sheath cuts or strips away an edge portion of the sheath thereby exposing the central conductor beyond the cut end portion of the sheath. The V-shaped configuration of the third cutting edge 84 produces slight chamfers on the cut edge of the sheath 18. This arrangement of third cutting edge 84 effectively eliminates need for any secondary or deburring operation on the cable sheath 18 to prepare the sheath for termination.

As previously noted, the tool handle 24 is formed as a separate part of the tool holder 20 and may be positioned on the cutter 22 in any one of three possible angular positions relative to the first cutting edge 64. This arrangement enables a worker using the tool to set the T-shaped handle at a comfortable angular position relative to the cutting edge 64 for starting a cut on a preinstalled cable. The handle may be readily removed from the tool by loosening the set screw 28 to expose the cutter shank 50 so that the cutter may be chucked in a rotary power tool set to operate at slow speed to perform the aforesaid cable preparation operation under power, if so desired.

We claim:

1. In a coaxial cable coring tool for use with a coaxial cable having an axially extending cylindrical central conductor, a generally cylindrical dielectric core in coaxially surrounding engagement with the conductor, and a generally cylindrical tubular outer sheath in coaxially surrounding engagement with the core, the coring tool including a cutter holder and an axially elongated cutter mounted in and projecting axially outwardly from the cutter holder, the cutter having an outer end and a coaxial cylindrical bore defined by a bore wall and opening through the outer end for receiving an end portion of the conductor therein, said bore having a diameter at least equal to the diameter of the conductor, said cutter including a generally cylindrical coring portion extending to the said outer end having an outside diameter substantially equal to the inside diameter of the tubular outer sheath, said coring portion including a first cutting edge for cutting away a portion of the core when said cutting tool is coaxially rotated in a cutting direction and in cutting engagement with and relative to the cable, and guide means mounted on the cutter holder and cooperating with an associated cable for maintaining the associated cable in generally coaxial alignment with the cutter as the cutter is rotated relative to the cable, the improvement comprising said first cutting edge extending outward from said bore wall to a termination point on the outer peripheral surface of said outer end, said termination point being spaced radially outwardly from the axis of said bore a distance less than the radial dimension of said cylindrical coring portion.

2. A coaxial cable coring tool as set forth in claim 1 wherein said coring portion has a generally conical axially outwardly converging chamfer at said outer end and said termination point is partially defined by said chamfer.

3. A coaxial cable coring tool as set forth in claim 2 wherein the axis of said conical chamfer is coincident with the axis of said cutter.

4. A coaxial cable coring tool as set forth in claim 2 wherein said coring portion has a spiral relief channel having opposing channel walls and opening outwardly through said outer peripheral surface and said outer end and said first cutting edge is further defined by the intersection of said opposing channel walls.

5. A coaxial cable coring tool as set forth in claim 4 wherein said relief channel is further defined by an inner end wall and said cutter includes a second cutting edge defined by the intersection of said inner end wall with a portion of the wall of said bore.

6. A coaxial cable coring tool as set forth in claim 5 wherein said second cutting edge comprises a rectilinear cutting edge generally parallel to the axis of said bore.

7. A coaxial cable coring tool as set forth in claim 6 wherein said second cutting edge is angularly spaced about the axis of said cutter from said first cutting edge.

8. A coaxial cable coring tool as set forth in claim 5 wherein said cutter has a third cutting edge axially spaced from said first cutting edge and said second cutting edge.

9. A coaxial cable coring tool as set forth in claim 8 wherein said third cutting edge is generally V-shaped.

10. A coaxial cable tool as set forth in claim 2 wherein said conical chamfer is defined by less than one full convolution of said coring portion.

11. A coaxial cable as set forth in claim 1 wherein said first cutting edge comprises a generally rectilinear edge.

12. A coaxial coring tool as set forth in claim 11 wherein said first cutting edge is skewed to the radial direction.

13. A coaxial cable coring tool as set forth in claim 1 wherein said first cutting edge extends from said termination point to said bore in skewed relation to an axial plane of said cutter passing through said termination point.

14. A coring tool as set forth in claim 13 wherein cutting edge is skewed relative to a radial line extending from the axis of said cutter and passing through said termination point.

15. A coring tool as set forth in claim 1 wherein said first cutting edge comprises a rectilinear cutting edge skewed at a compound angle relative to a line extending radially outwardly from the center of said cutter and passing through said termination point.

16. In a coaxial cable coring and skiving tool for use with a coaxial cable having an axially extending cylindrical center conductor, a generally cylindrical dielectric core in coaxially surrounding engagement with the conductor, and a generally cylindrical tubular outer sheath in coaxially surrounding engagement with the core, the coring and skiving tool including a cutter holder and a cutter mounted in said cutter holder and projecting axially outwardly therefrom, said cutter having an outer end and a coaxial cylindrical bore defined by a bore wall and opening through the outer end for receiving an end portion of the center conductor therein, said bore having a diameter at least equal to the diameter of the center conductor, said cutter including a generally cylindrical coring portion extending to the outer end and having a diameter substantially equal to the inside diameter of the tubular sheath, said coring portion including a first cutting edge for cutting away a portion of the core when said cutting tool is coaxially rotated in cutting engagement with and relative to the cable, said cutter having skiving means for cutting the dielectric core material to separate core material from a portion of the surface of the center conductor and including a second cutting edge partially defined by a portion of the bore wall, and guide means mounted on said cutter holder and cooperating with an associated cable for maintaining the associated cable in generally coaxial alignment with the cutter as the cutting is rotated in cutting engagement with the cable, the improvement comprising said first cutting edge extending outward in skewed relation to a radial line extending from said bore wall to a termination point on the outer peripheral surface of said outer end, said termination point being spaced radially outwardly from the axis of said bore a distance less than the radial dimension of said cylindrical portion.

17. A coaxial coring and skiving tool as set forth in claim 16 wherein said coring portion has a generally conical axially outwardly converging chamfer at said outer end commencing at said termination point and defined by less than one full convolution of said coring portion.

18. A coaxial cable coring and skiving tool as set forth in claim 16 wherein said coring portion has a coaxial axially outwardly open spiral relief channel and said first cutting edge is partially defined by walls of said channel.

19. A coaxial cable coring and skiving tool as set forth in claim 16 wherein said first cutting edge comprises a rectilinear edge disposed at a compound angle relative to said radial line.

20. A coaxial cable coring and skiving tool as set forth in claim 17 wherein the axis of said conical chamfer is coincident with the axis of said cutter.

* * * * *

UNITED STATES PATENT AND TRADEMARK OFFICE
CERTIFICATE OF CORRECTION

PATENT NO. : 5,749,270
DATED : May 12, 1998
INVENTOR(S) : Roger R. Bourbeau

It is certified that error appears in the above-identified patent and that said Letters Patent is hereby corrected as shown below:

Column 2  Line 28, delete "5.5" and substitute --5-5--.

Line 54, delete "coaxially" and substitute --coaxial--.

Line 56, delete "coaxially" and substitute --coaxial--.

Line 59, delete "coaxially" and substitute --coaxial--.

Column 3

Line 6, after "away", delete "in".

Line 48, delete "coaxially" and substitute --coaxial--.

Column 4

Line 4, delete "28" and substitute --37--.

Line 24, delete "is formed".

Line 25, after "formed" insert --by--.

Line 34, after "by" insert --the--.

Column 5

Line 13, delete "V-shaped" and substitute --V-shape--.

Line 48, delete "established" and substitute --establishes--.

Signed and Sealed this

Sixth Day of July, 1999

Attest:

Q. TODD DICKINSON

*Attesting Officer*      *Acting Commissioner of Patents and Trademarks*